United States Patent [19]

Henson

[11] Patent Number: 5,871,797

[45] Date of Patent: *Feb. 16, 1999

[54] REDUCED SODIUM CONTENT PROCESS CHEESE AND METHOD FOR MAKING IT

[75] Inventor: Lulu S. Henson, South Plainsboro, N.J.

[73] Assignee: FMC Corporation, Philadelphia, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 561,510

[22] Filed: Nov. 21, 1995

[51] Int. Cl.$^6$ ..................................... A23C 19/00
[52] U.S. Cl. .............................. 426/582; 426/36; 426/72; 426/580
[58] Field of Search ................. 426/34, 36, 580, 426/582, 654, 72, 662

[56] References Cited

U.S. PATENT DOCUMENTS

| | | | |
|---|---|---|---|
| 2,163,778 | 6/1939 | Draisbach et al. | 99/162 |
| 2,564,374 | 8/1951 | Roland | 99/116 |
| 3,306,753 | 2/1967 | Norsen | 99/143 |
| 3,775,543 | 11/1973 | Zyss et al. | 426/371 |
| 3,922,374 | 11/1975 | Bell et al. | 426/582 |
| 4,080,477 | 3/1978 | Tsumura et al. | 426/656 |
| 4,397,926 | 8/1983 | Galal et al. | 426/582 |
| 4,609,553 | 9/1986 | Zboralski et al. | 426/36 |
| 5,211,978 | 5/1993 | Merkenich et al. | 426/582 |
| 5,374,443 | 12/1994 | Jackson et al. | 426/582 |

FOREIGN PATENT DOCUMENTS

| | | |
|---|---|---|
| 0158132 | 9/1983 | Japan . |
| 6 3052-840-A | 3/1988 | Japan . |
| 2106366 | 4/1983 | United Kingdom . |

OTHER PUBLICATIONS

S.K. Gupta, C. Karahadian and R.C. Lindsay; *Effect of Emulsifier Salts on Textural and Flavor Properties of Processed Cheese;* 1984; Journal of Dairy Science, vol. 67, No. 9; pp. 764–778.

C. Karahadian and R.C. Lindsay; *Flavor and Textural Properties of Reduced–Sodium Process American Cheese;* 1984; Journal of Dairy Science, vol. 67, No. 9; pp. 1892–1904.

*Primary Examiner*—Leslie Wong
*Attorney, Agent, or Firm*—Polly E. Ramstad

[57] ABSTRACT

A method of producing a reduced sodium process cheese from a natural cheese using selected phosphate salts: disodium phosphate, dipotassium phosphate and/or tripotassium phosphate, and tricalcium phosphate and/or dicalcium phosphate. A formulation that is a blend of such salts. A cheese that contains these salts.

6 Claims, No Drawings

REDUCED SODIUM CONTENT PROCESS CHEESE AND METHOD FOR MAKING IT

FIELD OF THE INVENTION

This invention is in the field of process cheese and more particularly it is in the field of reduced sodium process cheese.

BACKGROUND

Reduced-sodium products currently found in the dairy case may be formulated with any combination of potassium salts such as potassium chloride, potassium citrate, and potassium phosphate. These potassium salts either totally or partially replace their sodium counterparts. One study mentions the usefulness of tripotassium citrate, dipotassium phosphate, and tetrapotassium pyrophosphate in the development of blends of emulsifier salts for reduced-sodium processed cheeses (R. C. Gupta, C. Karahadian, and R. C. Lindsay "Effect of Emulsifier Salts on Textural and Flavor Properties of Processed Cheeses," Journal Dairy Science 67:764–778 (1984)).

A separate study reported an acceptable process American-type cheese containing up to 75% less sodium than traditional process cheeses was manufactured from Cheddar cheese salted with 2.1% Lite Salt (1:1 NaCl/KCl) and an emulsifier system containing tripotassium citrate (1.16%), dipotassium phosphate (0.46%), and trisodium citrate (0.23%). (C. Karahadian and R. C. Lindsay, "Flavor and Textural Properties of Reduced-Sodium Process American Cheeses," J. Dairy Science 67:1892–1904 (1984)). Better acceptability scores were obtained when delta-gluconolactone (0.33%) and enzyme-modified cheese paste (1.86%) were added to enhance the intensity of cheese flavor. Process cheese prepared with unsalted Cheddar had distinctive flavors which detracted from preference scores as compared with those made from lightly salted Cheddar cheese.

U.S. Pat. No. 4,609,553 discloses a method for producing soft cheese using an insoluble calcium phosphate (CaO/$P_2O_5$ ratio from 2.5:1 to 3.1:1) with a beta-tricalcium phosphate content of 50–100% and a specific surface area from 20–80 $m^2$/g and average grain size from 1–20 microns. However, this patent does not pertain to reducing the sodium content of the resulting cheese product with the use of the calcium phosphate.

SUMMARY OF THE INVENTION

The invention is a reduced sodium process cheese that can be made because of novel and selective use of certain phosphates. These phosphates include disodium phosphate; dipotassium phosphate and/or tripotassium phosphate; and tricalcium phosphate and/or dicalcium phosphate. In another aspect, the invention includes a process for making a reduced sodium process cheese. And, in yet another aspect, the invention includes a formulation containing the selected phosphates.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about", and all percents are understood to be weight percents.

A reduced sodium content process cheese can be made using orthophosphate salts of sodium, potassium, and calcium. Generally, the reduced sodium content is achieved by incorporating the following salts into the process cheese: disodium phosphate (DSP, anhydrous or dihydrate) and or trisodium phosphate (TSP, anhydrous or dihydrate); dipotassium phosphate (DKP) and/or tripotassium phosphate (TKP); and tricalcium phosphate (TCP) and/or dicalcium phosphate (DCP, anhydrous or dihydrate). Preferably, these salts are food grade or better.

The incorporation of these phosphates in a process cheese, at least in partial substitution for the sodium chloride and other salts normally used to impart taste and other qualities to process cheese, results in a reduction in sodium levels. The use of these phosphate salts permits a sodium reduction of from 35 to 65% relative to a full sodium process cheese (hereinafter called the "reference") which contains 1.6% sodium approximately. The taste of such a reduced sodium process cheese can be as acceptable as that of a full sodium product. Moreover, the emulsion stability of the reduced sodium process cheese and the reference are similar. The term "reduced sodium," as used herein, does not necessarily meet the legal definition or requirement for sodium content claims as defined by the NLEA of the United States (Nutritional Labeling and Education Act of 1990). The term refers to a cheese product, having 550 to 950 mg Na/100 g, that has been made from a natural cheese. Since typical process cheese contains from 1370 to 1620 mg Na/100 g, the process cheese of this invention is termed "reduced sodium." Thus with the reduction, based on a Reference of 1.6% sodium, a sodium reduced cheese generally having between 0.5 to 1.05% sodium, preferably between 0.5 to 0.90% sodium, and most preferably between 0.5 to 0.80% sodium, may be made.

An acceptable process cheese can be obtained by a combination of phosphate salts, typically orthophosphate salts, and without the use of potassium chloride or citrate. A natural cheese, used alone or in combination with other natural cheese can be used to achieve the desired flavor profile of the process cheese. Such natural cheese can be salted, unsalted, or lightly salted, alone or in combination. The natural cheeses include any from which a process cheese may be made.

Tricalcium phosphate can be used successfully with DSP (anhydrous or dihydrate) and DKP and/or TKP to produce a creamy smooth process cheese of reduced sodium content. These salts are used in place of some or all of the sodium chloride that is, otherwise, normally used in making cheese. The phosphate salts can be used as a solid, or may be solubilized, and then used as a solution or as a slurry in making the process cheese. In such a manner of substitution, the reduced sodium values are attained.

The various forms of di- and trisodium phosphates that may be used to prepare the reduced sodium process cheese are products of commerce. The preferred forms are the hydrates, such as DSP duohydrate and TSP dodecahydrate (more commonly known as TSP crystals). These hydrated forms are able to dissolve faster in the aqueous phase of the cheese mixture during process cheese manufacture. However, the anhydrous forms may also be used if the process allows the phosphates to be dissolved during cooking. DSP (dry basis) or TSP (dry basis), individually, but on a combined basis when used together, may be present at 0.4–2.0%, preferably 0.8 to 2.0% and more preferably 0.8 to 1.5, and most preferably 0.8–1.2%, in the process cheese.

Di- and tri-potassium phosphates (DKP and TKP, respectively) provide emulsification in the process cheese without increasing the sodium content of the process cheese. DKP (dry basis) and TKP (dry basis) individually, but on a combined basis when used together, may be present at 0.1 to 0.9%, preferably at 0.25 to 0.75%, and most preferably at 0.35 to 0.65%. Generally, however, use within the range of 0.25–0.75% does not result in a perceived bitter taste. As the percentage used increases however, bitterness may become noticeable.

The di- and tri- potassium phosphates also permit pH control, when used within the limits just discussed. It is desirable to maintain the pH within the range of 5.3–5.9, but more preferred to maintain the pH within the range of 5.4 to 5.8.

The di- and tri-calcium phosphates (hereinafter referred to as DCP and TCP, respectively) are used to control the grittiness of cheese. The DCP (dry basis) and TCP (dry basis) individually, or on a combined basis when used together, may be present at 0.01 to 1.6%, preferably at 0.2 to 1.4%, more preferably at 0.5 to 1.3%, and most preferably at 0.8 to 1.2%. It is critical that the TCP or DCP used be an especially finely-milled product. Commercially available TCP or DCP having particles of 25 microns will not produce a satisfactory cheese. Generally a TCP or DCP having an average particle size of less than 3.5 microns can be used, with the caveat that as the average particle size increases beyond 3.0 microns, the process cheese made with the TCP or DCP tends to have a more sandy mouthfeel. Because of the desirability of avoiding the sandy texture imparted by larger particle sizes, an average particle size of less than 3.0 microns is preferred, as such a small average particle size minimizes the likelihood of occurrence of a sandy texture. TCP or DCP with an average particle size of less than 2.3 microns is most preferred, since the tendency to have a problem with sandy texture decreases as the average particle size decreases.

Obtaining a TCP having average particle sizes within the recommended ranges generally indicates that the TCP is suitable for use in the claimed invention. A finely-milled product made according to the specifications provided herein will tend to have a top particle size of less than 7.8 microns. It is believed that as the top particle size of the TCP decreases there may also be a corresponding decrease in sandy texture. For this reason the term occurrence of particles sized greater than 7.8 microns should be minimized.

All ingredients, including the phosphates, are directly added to the natural cheese. To insure their uniform distribution in the process cheese, phosphates and the other dry ingredients (salt, sorbic acid, carrageenan, flavor, etc.) may be pre-blended with the ground cheese prior to cooking. If preferred, the sodium and potassium phosphates may be added to the cheese in the form of a liquid concentrate or predissolved with the aqueous ingredients of the process cheese. Calcium phosphates may be added in the form of a slurry.

A medium aged, natural cheese such as a regular Cheddar, typically 4–6 months old, or an unsalted or lightly salted Cheddar, of up to 3 months old, can be used to make the process cheese. It is important to use the natural cheese within the time period recommended by the manufacturer to avoid spoilage defects and the formation of undesirable flavor or texture in the process cheese. A blend of regular and unsalted/lightly salted Cheddar provides the optimum flavor and texture to the process cheese.

Water, skim milk, buttermilk, or other dairy liquid products may be used singly or in combination with each other to achieve the desired moisture, and butterfat content of the process cheese.

Additionally, an enzyme modified cheese (EMC) can be added to enhance the flavor of the reduced sodium process cheese. Excess EMC (greater than 2%) could result in soapy or bitter off-flavors and would also increase the sodium content of the process cheese. An agent, such as sorbic acid (0.1 to 0.2%), is used to enhance the microbial stability of the process cheese. Other optional ingredients familiar to those skilled in the art may be added as needed to impart desired characteristics. One such optional ingredient, carrageenan, may be added to improve the textural properties of the process cheese.

A process cheese product may be made from a full fat, a low fat, or a non-fat natural cheese. The pasteurized process cheese product can be made by mechanically reducing the natural cheese to a uniform mixture of fine particles, and then dry blending with a blend of appropriate functional process cheese constituents, such as an emulsifying agent (sodium or potassium citrate, phosphate, pyrophosphate, aluminum phosphate, or tartrate, and other known emulsifying agents), a preservative (salt, sorbic acid), gelling agent (kappa, lambda, or iota carrageenan, alone or in combination; carob bean gum, gum karaya, gum tragacanth, guar gum, gelatin, cellulose gum, oat gum, algin, xanthan gum), a protein source (non-fat milk solids, sweet dairy whey), a sweetener (corn syrup, corn syrup solids, other common sweeteners, sugar, dextrose, corn sugar, glucose syrup, glucose syrup solids, maltose, malt syrup, and hydrolyzed lactose), moisture content control agent (water), and acidifying agent (lactic acid, acetic acid, citric acid, and phosphoric acid); and optionally, a preservative (the sodium or calcium salts of proprionic acid and sorbic acid, and nisin), a colorant (annatto seed extract or any other harmless artificial colorant), and a flavorant (any flavoring that simulates the taste of cheese of any age or variety). The resultant mixture is then pasteurized, preferably at a temperature greater than 65.5° C. (150° F.). The cheese when pasteurized is in a molten form that can be poured into a mold or into slice forming equipment, and cooled to provide a firm process cheese product that is sliceable at room temperature.

The finished pasteurized process cheese product conforms to the National Cheese Institute guidelines for pasteurized process cheese product. According to these guidelines the pasteurized process cheese product has more than 45% base cheese for certain cheese mixtures, more than 51% base cheese for all others; not more than 3% emulsifying agents; not more than 0.8% gelling agent; a final product pH >4; between 44–60% moisture; 0.1 to 0.3% preservative. Protein can be added to modify the texture, form, and structure of the cheese.

The reduced sodium process cheese of this invention can be either of normal fat content such as the 24 to 32 wt % fat typically found in process cheese, or the reduced sodium process cheese of this invention can be a lower fat process cheese having from 12 to 21 wt % fat, or a process cheese having from 21 to 24% fat.

The phosphates may be separately added in making the process cheese, or alternatively they may be combined first and then added as a formulation, such as a simple mixture, or as a blend. The phosphates in the formulation preferably will be present in a ratio of ranges that is based on the ranges described, herein, for using these phosphates in the process cheese.

The suitability of a process cheese for human consumption is determined by a taste test. In the test, a panel of people takes a slice of cheese, eats it, and then rates it. The rating is measured by a seven point hedonic scale. According to that scale the ratings are as follows:

| | |
|---|---|
| 1 | Dislike very much |
| 2 | Dislike moderately |
| 3 | Dislike slightly |
| 4 | Neither like nor dislike |
| 5 | Like slightly |
| 6 | Like moderately |
| 7 | Like very much |

This seven point hedonic scale is the one used in the examples cited herein. In practice, the cheese being tested is evaluated by a test panel, according to the seven point hedonic scale. The results for any given cheese are totaled and the average score is determined. Only, the average score is reported.

The following examples demonstrate the effectiveness of using the heretofore mentioned ingredients in the preparation of process cheese with reduced sodium content.

EXAMPLE 1

A standard process cheese was prepared containing approx. 1680 mg Na/100 g, 50% fat in dry solids, and 58–62% dry solid content from a full fat Cheddar (containing ~37% fat, ~1.7% NaCl added, 0.8% Na) by reducing the Cheddar and dry blending the reduced Cheddar and other ingredients as described in Table 1. The mixture was pasteurized and the resulting process cheese allowed to cool.

TABLE 1

|  | % |
|---|---|
| Cheddar | 81–83 |
| Skim milk | 7.5 |
| Buttermilk | 7.5 |
| Salt | 1.0 |
| DSP · duo | 2.5 |
| Sorbic acid | 0.1 |

The process cheese was found to be acceptable, somewhat salty, and physical properties were typical. Acceptability as judged by an informal taste panel was "like moderately."

EXAMPLE 2

Using the general process described in Example 1, a process cheese was prepared that contained less sodium than did the control produced in Example 1. The tricalcium phosphate used in the preparation had a top size of 7.8 microns and average particle size of 2.3 microns. The resulting cheese contained approx. 830 mg Na/100 g, 50% fat in dry solids, and 58–62% dry solids content.

TABLE 2

|  | % |
|---|---|
| Cheddar | 81–83 |
| Water | 15–16 |
| DSP · duo | 1.25 |
| TCP, fine-milled | 1.0 |
| DKP | 0.5 |
| Sorbic acid | 0.1 |

The process cheese possessed a creamy texture but was slightly softer than the control. This process cheese was judged by an informal taste panel as having the same acceptability as the control (Example 1). Meltability and emulsion stability (microwave test) were found similar to control. No bitter aftertaste was detected with the addition of 0.5% DKP.

EXAMPLE 3

A process cheese was made using the procedure of Example 1 using the ingredients specified in Table 3. A taste test was performed using a seven point Hedonic Scale.

TABLE 3

|  | CONTROL % | REDUCED-SODIUM % |
|---|---|---|
| Cheddar | 81–83 | 82.4 |
| Skim milk | 7.5 | 7.5 |
| Buttermilk | 7.5 | 7.5 |
| (1.5% fat) |  |  |
| Salt | 1.0 | 0.0 |
| DSP · duo | 2.5 | 1.0 |
| TCP, fine-milled | 0.0 | 1.0 |
| DKP | 0.0 | 0.5 |
| Sorbic acid | 0.1 | 0.1 |
| mg Na/100 g (approx.) | 1690 | 920 |
| mg Na/1 oz serving | 480 | 260 |
| Acceptability (7-point hedonic scale) | like moderately | like moderately |
| No of responses | 21 | 24 |

No significant difference in acceptability was found between the 10 control and the reduced-sodium process cheese. No bitter aftertaste or sandy texture was detected in the reduced-sodium product. The pH of the reduced-sodium process cheese was 5.5. Sodium reduction accomplished was approximately 46% relative to the control.

EXAMPLE 4

Further sodium reduction can be accomplished by using a lightly salted or unsalted Cheddar as the raw material. For optimum flavor and texture, a blend of medium aged regular Cheddar and lightly salted/unsalted Cheddar is recommended. Enzyme modified cheese paste addition is recommended to improve flavor. For lightly salted/unsalted Cheddar and enzyme modified cheese paste, it is important to limit the age of the raw materials. Beyond a certain age, generally three months, bitter and soapy compounds are produced that detract from the flavor and the texture of the reduced sodium process cheese.

TABLE 4

|  | % |
|---|---|
| Cheddar (1.8–2% NaCl) | 40–42 |
| Cheddar (0–0.5% NaCl) | 40–42 |
| Water | 15–16 |
| Enzyme modified cheese | 0.5–1 |
| Carrageenan | 0–0.5 |
| DSP · duo | 1.0 |
| TCP, fine-milled | 1.0 |
| DKP | 0.5 |
| Sorbic acid | 0.1 |
| Cheese flavor | As needed |

A product containing 590–700 mg Na/100 g, a sodium reduction between 52–65% relative to the control (Example 3) is desired. Skim milk and buttermilk can be used instead of water to enhance the creaminess or flavor of the product without significantly increasing the sodium content of the process cheese. Dicalcium phosphate (DCP, anhydrous or dihydrate) can be used as a partial or total substitute for TCP in the process cheese as long as the DCP has a particle size similar to that previously defined for TCP (refer to Example 2). Tripotassium phosphate (TKP) may also be used in combination with or a substitute for DKP to increase pH slightly. However, as the amount of TKP increases beyond 0.5% bitterness may increase to unacceptable levels.

EXAMPLE 5

A 30-lb batch of Example 3 (packed in 2-lb blocks) was successfully prepared in an auger-type, steam-jacketed cooker. A cheddar cheese was ground through a ⅜-inch plate and dry ingredients were blended in. Cooking time was 10 minutes and a maximum product temperature of 160° F. was reached. The process melt properties of the product in the auger-type cooker were similar to those obtained in the lab using a Stephan cooker. The process cheese exhibited a shelf life of at least 6 months under refrigeration.

EXAMPLE 6

Sodium reduction in process cheese with reduced fat content can also be accomplished by using the blend of DSP●duo, DKP and TCP as in preceding examples. The cheese stock includes lightly salted/unsalted Cheddar and Cheddar containing 30–50% less fat than a regular Cheddar (typically contains 31–37% fat). Carrageenan may be added to improve melt and textural properties of the process cheese. A typical formula consists of:

TABLE 5

|  | % |
|---|---|
| Cheddar (14–21% fat) | 60–82 |
| Cheddar (0–0.5% NaCl) | 0–22 |
| Skim milk or Water | 15–16 |
| Enzyme modified cheese | 0.5–2 |
| Salt | 0–0.3 |
| Carrageenan | 0–0.5 |
| DSP · duo | 1.0–1.25 |
| TCP, fine-milled | 1.0 |
| DKP | 0.5–0.75 |
| Sorbic acid | 0.1 |
| Cheese flavor | As needed |

The product will contain 12–21% fat and 550–950 mg Na/100 g. Commercially available process cheese and cheese food contain 24–32% fat and 1370–1620 mg Na/100 g.

I claim:

1. A processed cheese comprising 12 to 32 weight percent fat; 550–950 mg of sodium per 100 grams of cheese; 0.40 to 2.0 wt % disodium orthophosphate; 0.1 to 0.9 wt % of a di- or tri-potassium orthophosphate, alone or in combination; and 0.1 to 1.6 wt % di- or tri- calcium orthophosphate, alone or in combination; wherein said di- or tri- calcium orthophosphate, or combination thereof, has an average particle size of 3.0 microns or less.

2. The processed cheese of claim 1, wherein there is 0.8 to 1.2 wt % disodium orthophosphate; 0.35 to 0.65 wt % di- or tri- potassium orthophosphate, alone or in combination; and 0.5 to 1.3 wt % di- or tri- calcium orthophosphate, alone or in combination.

3. The processed cheese of claim 1, wherein the tricalcium orthophosphate or the dicalcium orthophosphate have an average particle size of 2.3 microns or less.

4. The processed cheese of claim 1, wherein no more than 2 wt % of the tricalcium orthophosphate or the dicalcium orthophosphate has a top particle size of 7.8 microns.

5. A method of preparing a processed cheese comprising the steps of mixing a comminuted natural cheese with a liquid dairy based product, disodium orthophosphate, a di- or tri- potassium orthophosphate, alone or in combination, and a di- or tri- calcium orthophosphate, alone or in combination, wherein the orthophosphates are in the respective amounts of 0.4 to 2.0; 0.1 to 0.9; 0.1 to 1.6, weight percent, based on the weight of the processed cheese, and wherein said di- or tri- calcium orthophospate, or combination thereof, has an average particle size of 3.0 microns or less, and heating the mixture to a pasteurizing temperature.

6. The method of claim 5, further including the step of adding milk to the natural cheese prior to pasteurization.

* * * * *

UNITED STATES PATENT AND TRADEMARK OFFICE
CERTIFICATE OF CORRECTION

PATENT NO. : 5,871,797
DATED : February 16, 1999
INVENTOR(S) : Lulu S. Henson

It is certified that error appears in the above-identified patent and that said Letters Patent are hereby corrected as shown below:

Column 5, line 38, please add the symbol "%" to Table 2 above the numerical ranges.

Column 6, line 20, delete the number "10".

Signed and Sealed this

Twenty-ninth Day of May, 2001

Attest:

NICHOLAS P. GODICI

*Attesting Officer*     *Acting Director of the United States Patent and Trademark Office*